J. N. BECKER.
Bee-Hive.
No. 197,814.  Patented Dec. 4, 1877.
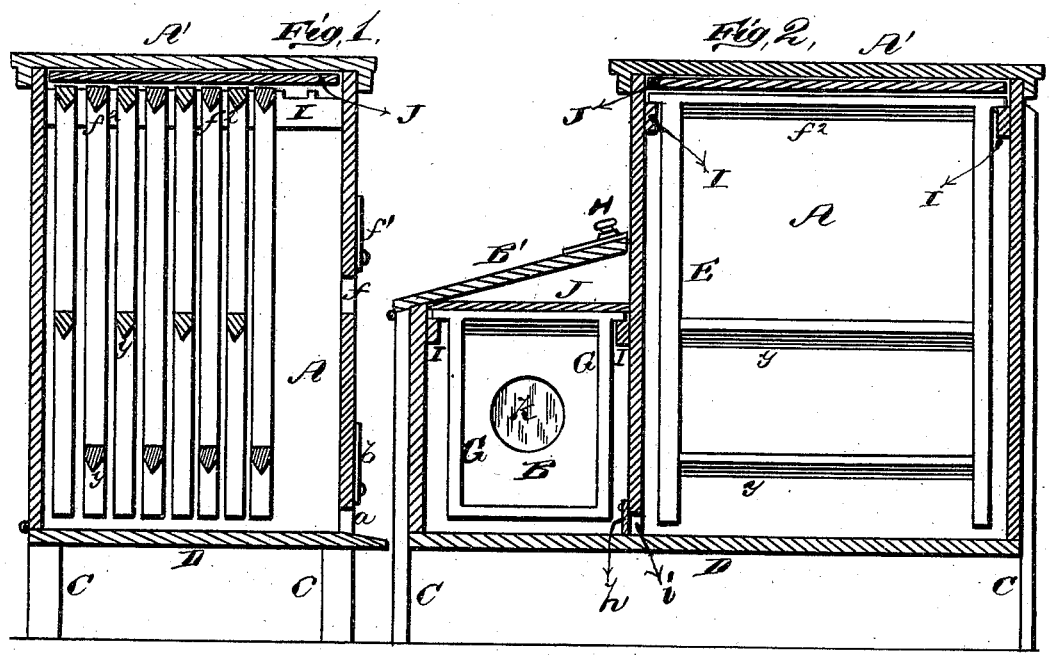
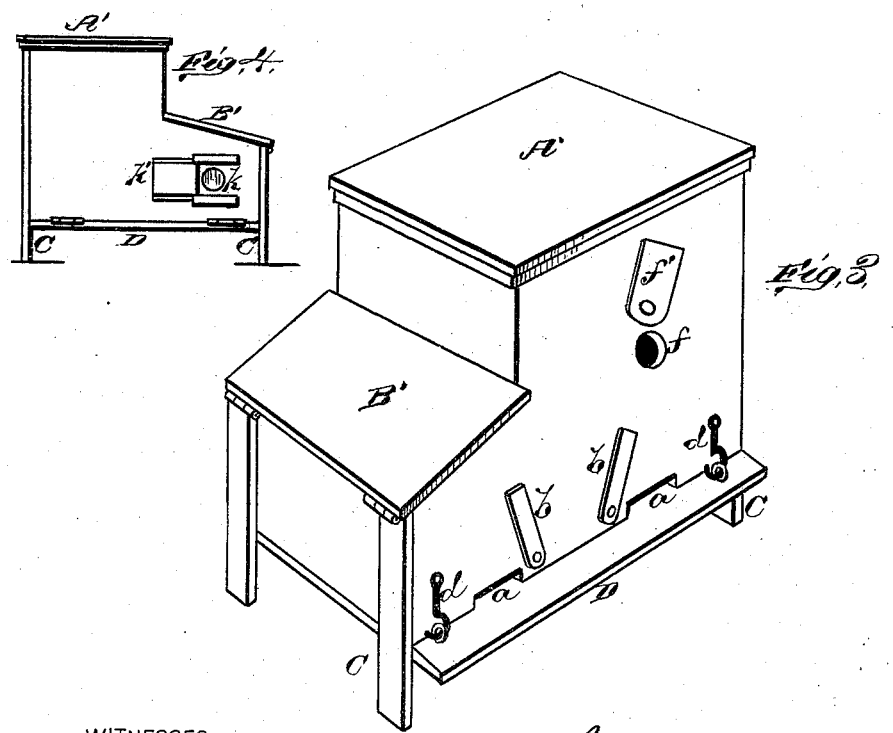

UNITED STATES PATENT OFFICE.

JACOB N. BECKER, OF OAKFIELD, MICHIGAN.

IMPROVEMENT IN BEE-HIVES.

Specification forming part of Letters Patent No. 197,814, dated December 4, 1877; application filed October 6, 1877.

*To all whom it may concern:*

Be it known that I, JACOB N. BECKER, of Oakfield, in the county of Kent and State of Michigan, have invented a new and valuable Improvement in Bee-Hives; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a transverse vertical section of my bee-hive. Fig. 2 is a longitudinal vertical sectional view. Fig. 3 is a perspective view, and Fig. 4 a side view thereof.

The nature of my invention consists in the construction and arrangement of a bee-hive, as will be hereinafter more fully set forth.

The annexed drawings, to which reference is made, fully illustrate my invention.

The body of my bee-hive is constructed to form a brood-chamber, A, and an overplus or honey chamber, B, at the side thereof, and of smaller dimensions than the brood-chamber. The hive-body is supported upon legs C C, and has a bottom, D, which latter is hinged at its rear to the hive, and held up in place at the front by hooks $d$ $d$, as shown.

It will be observed that by constructing the bee-hive with a hinged bottom, underlying the chambers A and B, the dead bees and dirt accumulating on it can readily be removed by opening the bottom, when by gravity the refuse matter on it will slide off.

In the front of the hive are bee-entrances $a$ $a$, each provided with a pivoted door or slide, $b$, for regulating the size thereof or closing it altogether.

In the partition between the brood and honey chambers A and B is a passage, $i$, also provided with a pivoted door or slide, $h$. The brood-chamber A is also provided with a ventilating-opening, $f$, having a slide, $f'$, for closing the same when desired.

The honey-chamber B has in the rear a window, $k$, with sliding door $k'$ for observing the working of the bees.

The chambers A and B are respectively provided with comb-frames E and G, the top bars of which project beyond the side bars, and are supported upon notched cleats I I fastened at the top to the sides of the respective chambers.

The frames G are ordinary rectangular frames, while the frames E have their top bars made V-shaped to form comb-guides $f^2$, and are open at their lower ends, but have bars $y$ fastened to their side pieces at different distances from the lower ends, said bars $y$ being also in V form, as shown in Fig. 1, thus admitting of combs being made of varying sizes.

The chambers A B are provided with covers A' B', respectively, hinged to the hive or not, as desired. The cover B' is shown hinged and fastened by a spring-catch, H, while the cover A' is simply fitted on top of the chamber A.

Below the covers, on top of the comb-frames, are laid boards J J, as shown.

The overplus or honey chamber of the hive being on the side and on the same floor as the brood-chamber, the bees will make more honey than if the honey-chamber were on top.

The bottom D being hinged can easily be let down for cleaning.

The entrances can be closed tight, so that the bees cannot molest the operator while moving the hive.

The passage $i$ admits of the bees being driven from the honey-chamber into the brood-chamber when the racks are to be taken out.

What I claim as new, and desire to secure by Letters Patent, is—

In a bee-hive, the chambers A B, connected together by the passage $i$, and provided with the comb-frames E and G, hinged bottom D, underlying both chambers and provided with staples for the reception of the pivoted hooks $d$ $d$, and the hinged cover B', substantially as described, and for the purpose set forth.

In testimony that I claim the above I have hereunto subscribed my name in the presence of two witnesses.

JACOB N. BECKER.

Witnesses:
MOSES PETERSON,
BENJAMIN POLLEN.